United States Patent Office 2,732,371
Patented Jan. 24, 1956

2,732,371

ALPHA ALKYL STYRENE DIMER POLYMERIZATION MODIFIERS

Henry W. Wehr and Floyd B. Nagle, Midland, Mich., assignors to The Dow Chemical Company, Midland, Mich., a corporation of Michigan No Drawing. Application May 25, 1951, Serial No. 228,351

9 Claims. (Cl. 260—93.5)

This invention relates to polymers of vinylidene compounds and pertains to agents for regulating the polymerization of such compounds. It particularly concerns a method and agents for regulating the molecular weight of the polymers and copolymers obtained by the polymerization of one or more vinylidene compounds.

It is known that the physical and mechanical properties of the polymers of vinylidene compounds are dependent in part upon the molecular weight of the polymer and that the molecular weight of the product can be lowered by raising the temperature at which the polymerization is carried out to increase the rate of the polymerization reaction, or by carrying out the polymerization in the presence of a solvent for the polymer. Raising the temperature at which the polymerization is carried out to lower the molecular weight of the product is often undesirable since it frequently involves a considerable increase in the rate of a strongly exothermic polymerization reaction and may result in an uncontrollable or "runaway" polymerization reaction, or in the formation of a product of non-uniform quality. Dilution of the reaction mixture with a solvent usually causes a considerable reduction in the rate of reaction and a lowering of the molecular weight of the polymer. In most instances, the proportion of solvent required to reduce the molecular weight of the product by any great amount, e. g. to one-half of that of the product obtained in the absence of the solvent under otherwise similar polymerization conditions, is quite large and adds considerably to the cost of the operation.

It has now been discovered that the unsaturated dimers of a monomeric alpha-alkyl-vinyl aromatic compound having the general formula:

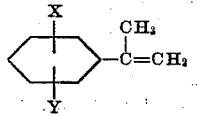

wherein each of the symbols X and Y represents the same or different members of the group consisting of hydrogen, halogens and lower alkyl radicals containing not more than three carbon atoms, have an unusual effect as modifying agents for regulating the polymerization of vinylidene compounds to produce polymers having a substantially lower average molecular weight than is obtained in the absence of such unsaturated dimer under otherwise similar polymerization conditions. For convenience, the alpha-alkyl-vinyl aromatic compounds having the above formula are hereinafter referred to as "alpha-alkyl styrenes."

By incorporating a small amount, suitably from 0.001 to 5 per cent by weight, of an unsaturated dimer of an alpha-alkyl styrene having the aforementioned formula with a monomeric vinylidene compound and polymerizing the same in any usual way, the polymerization occurs so as to form a polymeric product which appears to be composed for the most part of polymer molecules having a relatively narrow range of molecular weights. The effect of such unsaturated dimer in causing a reduction in the average molecular weight of the polymer being formed and in modifying the polymerization reaction increases quite sharply as the proportion of the unsaturated dimer in the starting materials is increased. The unsaturated dimers also have an inhibiting effect on the polymerization of vinylidene compounds. This tendency to inhibit, or reduce the rate of, the polymerization reaction varies depending for the most part upon the kinds of monomeric compounds being polymerized. For certain of the polymerizable starting materials, e. g. vinylidene chloride, vinyl chloride, vinyl acetate, or methyl isopropenyl ketone, the proportion of an unsaturated dimer of an alpha-alkyl styrene to be employed in order to obtain a reduction in the molecular weight of the polymer being formed and at the same time maintain a satisfactory rate of polymerization is in the order of from 0.001 to 1 per cent by weight based on the weight of the starting materials. For the polymerization of other vinyl or vinylidene compounds such as styrene or methyl methacrylate, the unsaturated dimers of an alpha-alkyl styrene may satisfactorily be used ino amounts of from 0.001 to 5 per cent by weight of the polymerizable materials. In all instances the effect of the unsaturated dimers of an alpha-alkyl styrene in causing a reduction in the average molecular weight of the polymer being formed and in modifying the polymerization reaction increases quite sharply as the proportion of the unsaturated dimer is increased from a trace, e. g. from 0.001 to 1 per cent by weight. Further increases in the proportion of the unsaturated dimer causes a continued lowering of the molecular weight of the polymer which is formed, but this effect becomes less pronounced as the proportion of the unsaturated dimer is increased, e. g. from 1 to 5 per cent by weight of the mixture. For these reasons the unsaturated dimer, or mixture of unsaturated dimers, of an alpha-alkyl styrene are usually employed in amounts of 5 per cent by weight or less of the polymerizable starting materials.

The polymerization of certain acrylonitrile compositions in the presence of unsaturated dimers of an alpha-alkyl styrene, wherein the maximum operable proportion of the unsaturated dimer is less than may be employed herein, is described and claimed in our copending applications, Serial Nos. 228,352 and 228,353, filed concurrently herewith, now U. S. Patent Nos. 2,646,423 and 2,646,424.

The polymerization regulators or modifying agents with which the invention is concerned are the unsaturated dimers of monomeric alpha-alkyl styrenes. The unsaturated dimers may be prepared by procedure described in United States Patent 2,429,719. Examples of monomeric alpha-alkyl styrenes from which the unsaturated dimers may be prepared are alpha-methyl styrene, para-methyl-alpha-methylstyrene, para-ethyl-alpha-methylstyrene, para-isopropyl-alpha-methylstyrene, meta-ethyl-alpha-methylstyrene, meta-methyl-alpha-methylstyrene, ar-dimethyl-alpha-methylstyrene, ar-chloro-alpha-methylstyrene, 3,4-dichloro-alpha-methyl-styrene, ar-chloro-ar-methyl-alpha-methylstyrene, ar-diethyl-alpha-methylstyrene and ar-methyl-ar-isopropyl-alpha-methylstyrene.

It may be mentioned that the olefinic product obtained by the dimerization, i. e. the reaction of two molecules of a monomeric alpha-alkyl styrene having the aforementioned general formula with each other, is usually a mixture of isomeric unsaturated dimers which are difficult to separate from each other in usual ways, e. g. by distillation. For instance, the unsaturated product obtained by dimerizing alpha-methylstyrene, i. e. by the reaction of two molecules of alpha-methylstyrene with each other, usually consists of a mixture of the compounds 2,4-diphenyl-4-methyl-2-pentene and 2,4-diphenyl-4-methyl-1-pentene. The latter compound has an effect of causing a more pronounced lowering of the molecular weight of the polymer formed, e. g. by the polymerization of styrene, than has a like amount of the compound 2,4-diphenyl-4-methyl-2-pentene under otherwise similar polymerization conditions. However, both of the isomeric unsaturated dimers of alpha-methyl styrene are effective polymerization modifying agents for regulating the molecular weight of the polymeric product obtained by polymerizing a vinylidene compound so that mixtures of the isomeric unsaturated dimers may satisfactorily be used. The unsaturated dimers of the alpha-alkyl styrenes are usually employed as a liquid mixture consisting principally of the corresponding isomeric derivatives of 1-pentene and 2-pentene, together with a minor proportion, e. g. 15 per cent by weight or less, of the corresponding saturated or cyclic dimer of the monomeric alpha-alkyl styrene, although the unsaturated dimers may be used in pure or substantially pure form.

The unsaturated dimers, or mixture of unsaturated dimers, of the alpha-alkyl styrenes may be used as modifiers or control agents for the polymerization of any vinyl or vinylidene compound either alone or in mixture with one or more other unsaturated compounds containing a single carbon to carbon ethylenic, i. e. a non-aromatic double bond in the molecule. Examples of suitable vinylidene compounds are vinylidene chloride, vinyl chloride, ethyl acrylate, methyl methacrylate, vinyl acetate, methyl isopropenyl ketone, styrene, ortho-, meta-, and para-methylstyrene, ortho-chlorostyrene, para-chlorostyrene, ar-dichlorostyrene, meta-ethylstyrene, para-isopropylstyrene, ar-dimethylstyrene, acrylic acid, alpha-methyl styrene, para-methyl-alpha-methyl styrene and ar-dimethyl-alpha-methyl styrene.

In a preferred embodiment of the invention the unsaturated dimers are used as modifiers or control agents for the polymerization of monovinyl aromatic compounds either alone or in mixtures containing not more than 15 per cent by weight of one or more other vinyl or vinylidene compounds which are copolymerizable with the monovinyl aromatic compound. The term "monovinyl aromatic compound" pertains to aromatic compounds containing not more than 10 carbon atoms in the aromatic nucleus and having a single vinyl radical directly attached to a carbon atom of the aromatic nucleus, e. g. styrene or vinyl naphthalene. The monovinyl aromatic compounds are preferably monovinyl aromatic hydrocarbons and nuclear halogenated derivatives thereof.

Except for the requirement that one or more of the unsaturated dimers of an alpha-alkyl styrene be present, the polymerization or copolymerization of the monomeric vinyl aromatic compounds may be carried out in any usual way, e. g. by heating the same in mass in the presence of the unsaturated dimers, or in an aqueous emulsion. Catalysts for the polymerization such as benzoyl peroxide, acetylbenzoyl peroxide, ditertiary-butyl peroxide, tertiary-butyl hydroperoxide, or tertiary-butyl perbenzoate may advantageously be employed in bulk polymerizations, i. e. in the substantial absence of inert liquid media, but the presence of such catalyst is not required. For polymerizations carried out in aqueous emulsion catalysts such as hydrogen peroxide, and ammonium or potassium persulfate are usually employed, particularly at temperatures below about 60° C. In the instance where the polymerization is carried out in mass, i. e. in the presence of the unsaturated dimer only, but in the substantial absence of an inert liquid medium, the polymerization reaction is preferably carried out at temperatures between 80° and 150° C. The polymerization may be carried out in bulk at such temperatures until 90 per cent by weight or more of the starting materials have been polymerized and thereafter the mass may be heated at higher temperatures, e. g. at temperatures between 160° and 220° C., to substantially polymerize the remaining monomers.

In practice, the unsaturated dimers of an alpha-alkyl styrene, e. g. the dimers of alpha-methyl styrene, are mixed with the polymerizable starting materials in the desired proportion prior to effecting the polymerization. The unsaturated dimers are usually added before effecting the polymerization, but there are instances in which a mixture of a polymer of high molecular weight and the corresponding polymer of relatively low molecular weight is desired and in such instance the unsaturated dimer of an alpha-alkyl styrene may advantageously be added during the polymerization. The polymeric product is frequently obtained in a form suitable for direct employment for the intended purpose, but when necessary is treated in any usual way to obtain the same in the desired form. For instance, when the polymerization has been carried out in mass, volatile ingredients are usually vaporized from the product by heating in vacuum and the product is thereafter cooled and cut or ground to a suitable form. When the polymerization has been carried out in aqueous emulsion, the product is coagulated in any usual way, e. g. by adding any of a variety of agents such as sodium chloride, hydrochloric acid, or aluminum sulfate, which are capable of causing coagulation, and the product is separated from the aqueous liquor and is washed and dried.

The following examples illustrate ways in which the principle of the invention has been applied but are not to be construed as limiting the invention.

EXAMPLE 1

In each of a series of experiments, styrene together with unsaturated dimers of alpha-methyl styrene in amount as stated in the following table was polymerized by heating the same in a closed container in accordance with the following schedule of time and temperature conditions: 4 days at 95° C. and 2 days at 200° C. The unsaturated dimers of alpha-methyl styrene used in the experiments was a liquid boiling at a temperature of 144° C. at 5 millimeters absolute pressure. The polymer was removed from the container and crushed to a granular form. The rate of flow at 135° C. in terms of seconds required for a sample of the polymeric product to flow one and one-half inches through a 1/8 inch orifice under applied pressure of 1000 pounds per square inch was determined in accordance with the procedure described in A. S. T. M. D569–44T. The time required for this amount to flow becomes less with increase in the rate of flow. A portion of the polymer from each of the experiments was tested to determine the per cent volatile material therein and a viscosity characteristic. The procedure in determining the proportion of volatile material was to weigh a portion of the polymeric product, then heat it under vacuum at 213° C. and at 1 millimeter absolute pressure for 25 minutes, then cool and re-weigh. The loss in weight represents volatile ingredients. The viscosity characteristic was determined by dissolving a portion of polymeric product in toluene to form a solution containing 10 per cent by weight of said product and determining the absolute viscosity in centipoises at 25° C. of the solution. The viscosity is a relative measure of the average molecular weight of the polymeric material. The viscosity characteristic becomes lower as the molecular weight of the polymer decreases. Table I identifies each polymeric product by giving the relative proportions in per cent by weight, of styrene and the unsaturated dimers of alpha-methyl styrene used in preparing the same. The table gives the per cent by weight of volatile material in each of the polymers, the absolute viscosity of a 10 weight per cent solution of the polymer in toluene at 25° C., and the rate of flow at 135° C. in terms of seconds required for a sample of the polymer to flow one and one-half inches through a ⅛ orifice under an applied pressure of 1000 pounds per square inch.

Table I

| Run No. | Starting Materials | | Properties of Products | | |
|---|---|---|---|---|---|
| | Percent Styrene | Percent Unsaturated Dimers of Alpha-Methyl Styrene | Percent Volatiles | Viscosity, cps., 25° C. | Flow Rate, Seconds |
| 1 | 100 | 0 | 3.20 | 161 | 114 |
| 2 | 99 | 1 | 3.07 | 11 | 66 |
| 3 | 97 | 3 | 2.98 | 3.7 | 30 |
| 4 | 95 | 5 | 2.42 | 2.5 | 30 |

EXAMPLE 2

In each of a series of experiments, styrene, together with unsaturated dimers of 3,4-dichloro-alpha-methyl styrene in amount as stated in the table was sealed in a closed container and polymerized by heating the same in accordance with the schedule of time and temperature conditions described in Example 1. A portion of the polymer from each experiment was tested by procedure described in Example 1. Table II identifies each polymeric product by stating the relative proportions of styrene and unsaturated dimers of 3,4-dichloro-alpha-methyl styrene used in preparing the same. The table gives the per cent by weight of volatile material in each of the polymers, the absolute viscosity of a 10 weight per cent solution of the polymer in toluene and the rate of flow of the polymer at 135° C.

Table II

| Run No. | Starting Materials | | Properties of Products | | |
|---|---|---|---|---|---|
| | Percent Styrene | Percent Unsaturated Dimers of 3,4-dichloro-alpha-methyl Styrene | Percent Volatiles | Viscosity, cps., 25° C. | Flow Rate, Seconds |
| 1 | 100 | 0 | 0.66 | 79 | 270 |
| 2 | 99 | 1 | 0.85 | 22 | 128 |
| 3 | 97 | 3 | 1.05 | 12 | 68 |
| 4 | 95 | 5 | 1.15 | 8 | 57 |

EXAMPLE 3

In each of a series of experiments, styrene, together with unsaturated dimers of para-methyl-alpha-methyl styrene in amount as stated in the following table was sealed in a closed container and polymerized by heating the same under the time and temperature conditions described in Example 1. The unsaturated dimers of para-methyl-alpha-methyl styrene employed in the experiments was a liquid boiling at 140° C. at 2 millimeters absolute pressure. A portion of the polymer from each experiment was tested as described in Example 1. Table III identifies each polymeric product by giving the relative proportions of styrene and unsaturated dimers of para-methyl-alpha-methyl styrene used in preparing the same. The table also gives the per cent volatiles, the viscosity characteristic in centipoises and the flow rate in seconds determined for each polymer.

Table III

| Run No. | Starting Materials | | Properties of Products | | |
|---|---|---|---|---|---|
| | Percent Styrene | Percent Unsaturated Dimers of Para-methyl-Alpha-Methyl Styrene | Percent Volatiles | Viscosity, cps. | Flow Rate, Seconds |
| 1 | 100 | 0 | 0.77 | 216 | 284 |
| 2 | 99 | 1 | 1.53 | 40 | 121 |
| 3 | 97 | 3 | 2.52 | 12.8 | 58 |
| 4 | 95 | 5 | 2.79 | 7.1 | 46 |

In a series of similar experiments, except that unsaturated dimers of ar-dimethyl-alpha-methyl styrene boiling at 163° C. at one millimeter absolute pressure, was used as the polymerization modifying agent in the same relative proportion to the styrene as stated in Table III, the results were substantially the same.

EXAMPLE 4

In each of a series of experiments, ortho-chlorostyrene, together with unsaturated dimers of alpha-methyl styrene in amount as stated in the following table was sealed in a closed container and polymerized by heating the same as follows: 7 days at 40° C.; 2 days at 95° C.; and 2 days at 150° C. The polymer was removed from the container and crushed to a granular form. A portion of the polymer from each of the experiments was tested as described in Example 1. The unsaturated dimers of alpha-methyl styrene used in the experiments was a liquid boiling at 127° C. at 1.5 millimeters absolute pressure. Table IV identifies each of the polymeric products by giving the relative proportion of ortho-chlorostyrene and unsaturated dimers of alpha-methyl styrene used in preparing the same. The table also gives the per cent volatiles, a viscosity characteristic and the rate of flow at 135° C. determined for each polymer.

Table IV

| Run No. | Starting Materials | | Properties of Products | | |
|---|---|---|---|---|---|
| | Percent Ortho-chloro-Styrene | Percent Unsaturated Dimers of Alpha-methyl Styrene | Percent Volatiles | Viscosity, cps. | Flow Rate, Seconds |
| 1 | 100 | 0 | 5.61 | 9.0 | 76 |
| 2 | 99 | 1 | 5.78 | 7.0 | 57 |
| 3 | 97 | 3 | 6.1 | 7.0 | 47 |
| 4 | 95 | 5 | 6.84 | 7.0 | 37 |

EXAMPLE 5

In each of a series of experiments, an emulsion was prepared by mixing 100 grams of a mixture consisting of styrene and the unsaturated dimers of alpha-methyl styrene in amounts as stated in the following table with 140 grams of an aqueous solution which contained one gram of trisodium phosphate, 3 grams of Aerosol MA (the dihexyl ester of sodium sulfosuccinic acid) 3 grams of Dresinate (an alkali metal salt of rosin) and 0.7 gram of potassium persulfate as polymerization catalyst. The unsaturated dimers of alpha-methyl styrene used in the experiments was a liquid mixture consisting of 38 per cent by weight of 2,4-diphenyl-4-methyl-1-pentene, 50 per cent 2,4-diphenyl-4-methyl-2-pentene and 12 per cent of 1,1,3-trimethyl-3-phenyl indan. Each mixture was agitated and heated to a temperature of 60° C. over a period of 6 hours, after which the emulsion was coagulated and the polymeric product separated by filtering, washed and dried. A viscosity characteristic for the polymer from each experiment was determined by the procedure described in Example 1. Table V identifies each polymeric product by giving the relative proportion of styrene and the unsaturated dimer fraction used in preparing the same and also gives the viscosity characteristic of the polymer. For purpose of comparison, styrene polymerized under the same time and temperature conditions, but in the absence of the unsaturated dimers of alpha-methyl styrene is also included in the table.

*Table V*

| Run No. | Starting Materials | | Products |
|---|---|---|---|
| | Percent Styrene | Percent Unsaturated Dimer Fraction | Viscosity, cps. |
| 1 | 100 | 0 | 3,420 |
| 2 | 99.25 | 0.75 | 217 |
| 3 | 98.5 | 1.5 | 41 |
| 4 | 97.5 | 2.5 | 28 |
| 5 | 96.5 | 3.5 | 15 |

EXAMPLE 6

In each of a series of experiments, methyl methacrylate, together with unsaturated dimers of alpha-methyl styrene in proportions as stated in the following table was polymerized by heating the same in a closed container under the following time and temperature conditions: 6 days at 40° C.; 1 day at 95° C. and 2 days at 200° C. The unsaturated dimer of alpha-methyl styrene used in the experiments was a liquid boiling at 127° C. at 1.5 millimeters absolute pressure. The polymeric product was removed from the container and crushed to a granular form. Portions of each product were tested to determine the per cent volatile and a viscosity characteristic for the polymer as described in Example 1. Table VI identifies each polymeric product by giving the proportions in per cent by weight of methyl methacrylate and the unsaturated dimers of alpha-methyl styrene used in preparing the same. The table also gives the per cent by weight of volatile material in each of the polymers and a viscosity characteristic for the polymer. For purpose of comparison methyl methacrylate was polymerized under the same time and temperature conditions, except in the absence of the unsaturated dimers of alpha-methyl styrene, and is included in the table.

*Table VI*

| Run No. | Starting Materials | | Properties of Products | |
|---|---|---|---|---|
| | Percent Methyl Methacrylate | Percent Unsaturated Dimers of Alpha-Methyl Styrene | Percent Volatiles | Viscosity, cps. |
| 1 | 100 | 0 | 5.4 | Insoluble. |
| 2 | 99 | 1 | 1.36 | 53. |
| 3 | 97 | 3 | 1.95 | 31. |

Other modes of applying the principle of the invention may be employed instead of those explained, change being made as regards the method herein disclosed, provided the steps or ingredients stated by any of the following claims or the equivalent of such steps or ingredients be employed.

We claim:

1. In a process for polymerizing a monomeric material consisting of a monovinyl aromatic compound selected from the group consisting of the monovinyl aromatic hydrocarbons containing not more than 10 carbon atoms in the aromatic nucleus and nuclear halogenated derivatives thereof, the improvement which comprises carrying out the polymerization in the presence of from 0.001 to 5 per cent by weight of the polymerizable material, of an unsaturated dimer of a monomeric alpha-alkyl styrene having the formula:

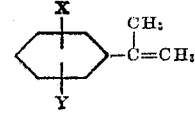

wherein X and Y each represents a member of the group consisting of hydrogen, halogens, and lower alkyl radicals containing not more than three carbon atoms.

2. In a process for polymerizing a monomeric material consisting of a monovinyl aromatic hydrocarbon containing not more than 10 carbon atoms in the aromatic nucleus, the improvement which comprises carrying out the polymerization in the presence of from 0.001 to 5 per cent by weight of the polymerizable material, of an unsaturated dimer of a monomeric alpha-alkyl styrene having the formula:

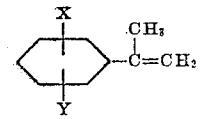

wherein X and Y each represents a member of the group consisting of hydrogen, halogens and lower alkyl radicals containing not more than three carbon atoms.

3. The process as claimed in claim 2 wherein, the monovinyl aromatic hydrocarbon is styrene.

4. The process as claimed in claim 2 wherein, the monovinyl aromatic hydrocarbon is styrene and the polymerization is carried out in the substantial absence of an inert liquid medium.

5. The method which comprises polymerizing a monomeric material consisting of a monovinyl aromatic hydrocarbon containing not more than 10 carbon atoms in the aromatic nucleus in the presence of from 0.001 to 5 per cent by weight of an unsaturated dimer of a monomeric alpha-alkyl styrene having the general formula:

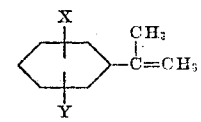

wherein X and Y each represents a member of the group consisting of hydrogen, halogens and lower alkyl radicals containing not more than three carbon atoms.

6. The method which comprises polymerizing a monomeric material consisting of a monovinyl aromatic hydrocarbon containing not more than 10 carbon atoms in the aromatic nucleus in the substantial absence of an inert liquid medium, and in the presence of from 0.001 to 5 per cent by weight of an unsaturated dimer of a monomeric alpha-alkyl styrene having the general formula:

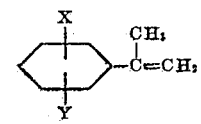

wherein X and Y each represents a member of the group consisting of hydrogen, halogens and lower alkyl radicals containing not more than three carbon atoms, by heating a mixture of the ingredients to polymerization temperatures between 80° and 220° C.

7. A process as described in claim 6 wherein the monovinyl aromatic hydrocarbon is styrene.

8. The method which comprises polymerizing styrene as substantially the sole monomeric material in the substantial absence of an inert liquid medium, and in the presence of from 0.001 to 5 per cent by weight of an unsaturated dimer of alpha-methyl styrene.

9. The method which comprises polymerizing styrene as substantially the sole monomeric material in the substantial absence of an inert liquid medium and in the presence of from 0.001 to 5 per cent by weight of an unsaturated dimer of para-methyl-alpha-methyl styrene.

References Cited in the file of this patent

UNITED STATES PATENTS

| | | |
|---|---|---|
| 2,646,423 | Wehr et al. | July 21, 1953 |

FOREIGN PATENTS

| | | |
|---|---|---|
| 506,290 | Great Britain | May 25, 1939 |
| 604,851 | Great Britain | July 12, 1948 |

OTHER REFERENCES

Frilette et al.: India Rubber World, 111, page 78 (October 1944).